United States Patent [19]

Lozada et al.

[11] 4,124,225
[45] Nov. 7, 1978

[54] SANDSHOE

[75] Inventors: Vicente M. Lozada, Centerville; William D. Walther, Kettering, both of Ohio; Lawrence J. Welp, Highland Heights, Ky.

[73] Assignee: Dayton-Walther Corporation, Dayton, Ohio

[21] Appl. No.: 842,049

[22] Filed: Oct. 14, 1977

[51] Int. Cl.$^2$ .............................................. B60S 9/02
[52] U.S. Cl. ................................... 280/763; 254/86 R
[58] Field of Search ............... 280/763, 764, 765, 766; 254/86 R, 86 H

[56] References Cited

U.S. PATENT DOCUMENTS

| 3,197,235 | 7/1965 | Chieger | 280/763 |
|---|---|---|---|
| 3,236,501 | 2/1966 | McKay | 280/765 |
| 3,904,224 | 9/1975 | Belke | 280/763 |

Primary Examiner—Robert R. Song
Attorney, Agent, or Firm—Biebel, French & Nauman

[57] ABSTRACT

A sandshoe for a semi-trailer landing gear is formed with an inverted V-shaped support member, the depending legs of which are attached to a bottom platform. The apex of the support member is received within a generally conforming, transversely oriented yoke carried on the bottom of the landing gear, and is attached thereto by bolts as well as by auxiliary retainer clips. The improved sandshoe is relatively light in weight yet provides high strength as compared to conventional sandshoes, in that the arrangement of the support member places the bottom platform in tension in the region between the legs of the support member.

6 Claims, 6 Drawing Figures

SANDSHOE

BACKGROUND OF THE INVENTION

This invention relates to extensible landing gears for semi-trailers of the general type disclosed in the U.S. patent of Phillips, et al, U.S. Pat. No. 3,892,141 issued July 1, 1975, and assigned to the same assignee as this invention.

More particularly, the invention relates to a platform foot element frequently employed with such landing gears and known in the trade as a sandshoe. The sandshoe is either a primary or an optional support, employed with landing gears for use in supporting semi-trailers on soft surfaces such as gravel, sand, soft asphalt and the like. A typical example of a conventional sandshoe is described herein in connection with FIG. 6 under the heading "Prior Art."

SUMMARY OF THE INVENTION

The present invention is directed to an improved sandshoe employing an inverted, generally V-shaped wedge or support mounted on a bottom ground contacting platform. The lower or extensible tube of the landing gear is provided with a generally C-shaped or semi-circular transverse socket or yoke which conforms generally to the curvature of the apex of the inverted V-shaped support, such that the load of the semi-trailer is applied generally to the apex and is transmitted through the legs of the support member thereof to the bottom platform. The geometric arrangement is such that a major portion of the platform, specifically the portion thereof between the legs, is placed in tension by the load, thus adding greatly to the strength of the unit and resisting deflection therein. The resulting sandshoe may thus be made lighter in weight and at lower cost as compared to the conventional sandshoe, and yet provide the same or greater strength and resistance against deflection.

It is accordingly an important object of this invention to provide an improved sandshoe construction in which a bottom platform supports an inverted wedge or V-shaped member, with a major portion of the platform stressed in tension when a load is applied to the appex region of the wedge.

Another object of the invention is the provision of a sandshoe, as outlined above, in which a generally C-shaped yoke formed on a landing gear is coupled to an inverted wedge portion of the sandshoe.

These and other objects and advantages of the invention will be apparent from the following description, the accompanying drawings and the appended claims.

DESCRIPTION OF THE PRIOR ART

Figure 6:
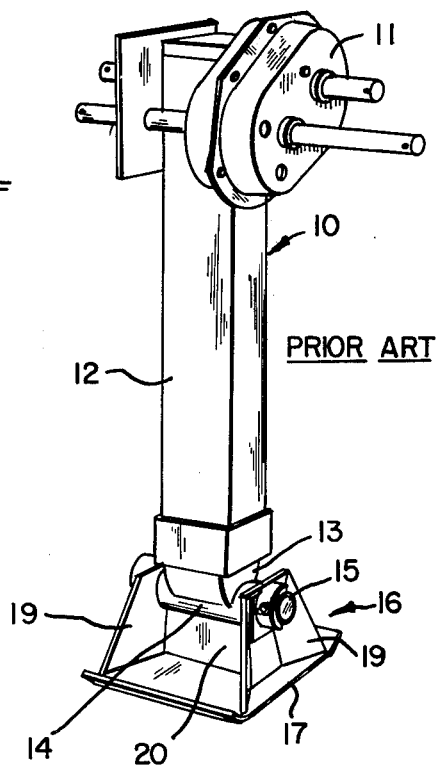
FIG. 6 is a perspective view of a prior art sandshoe.

A conventional landing gear is illustrated generally at 10 in FIG. 6 as including an upper two-speed gear mechanism 11 and a lower depending outer tube 12. An inner screw-driven tube 13 is slidably received within an outer support tube 12 for raising or lowering movement. The end of the inner tube 13 terminates in a transversely oriented, cylindrical member 14. The member 14 supports a transverse tube 15 which is received within side openings formed in a conventional sandshoe 16.

The sandshoe 16 has a bottom generally planar platform 17, a pair of upstanding side frame or web members 19 laterally positioned with respect to the platform 17. The tube 15 is captured in cylindrical bosses on the side frames 19. A transversely extending, vertically oriented strengthening plate or web 20 extends between the members 19 in underlying relation to the member 14. When viewed from the front or back, it will be seen that the weight is applied by the tube 15 directly to the side frame members 19. The frame members 19 are generally vertically oriented on the platform 17, and the weight thus is transferred directly downwardly to the platform 17. Sideways bending deflections are resisted by the central member 20 which also serves to strengthen the platform 17. In use, the stresses within the platform 17 are either generally neutral or are in compression.

DESCRIPTION OF THE PREFERRED EMBODIMENT

Figure 1:
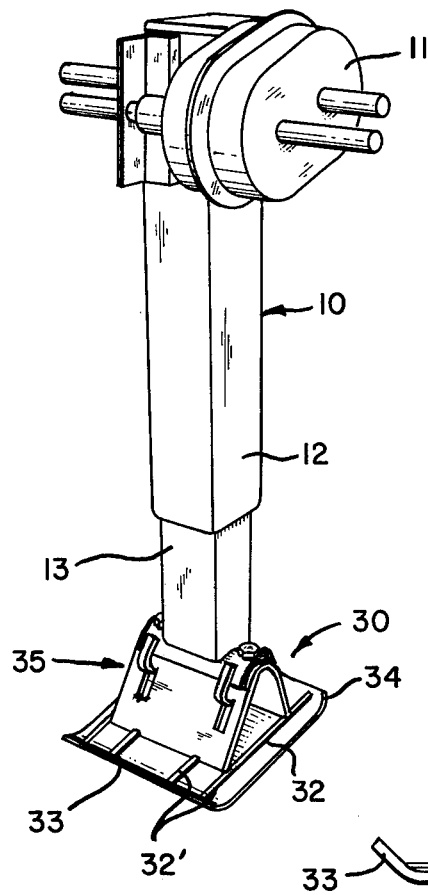
FIG. 1 is a perspective view of one embodiment of the invention.
Figure 2:
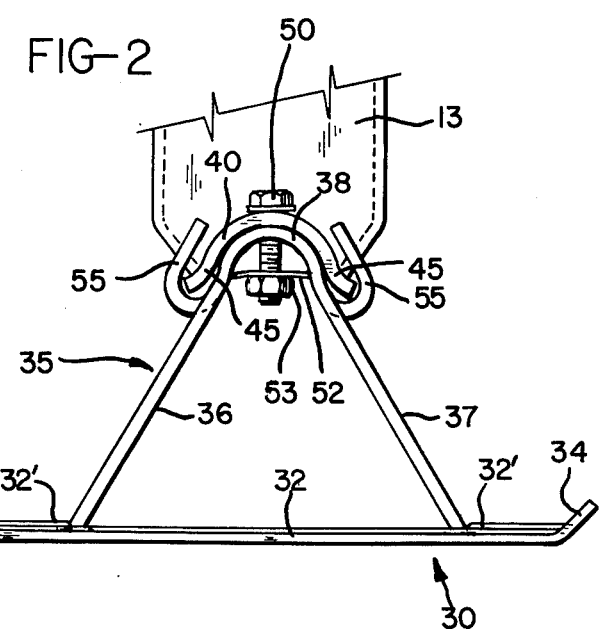
FIG. 2 is an enlarged side elevation of the sandshoe of FIG. 1.
Figure 3:
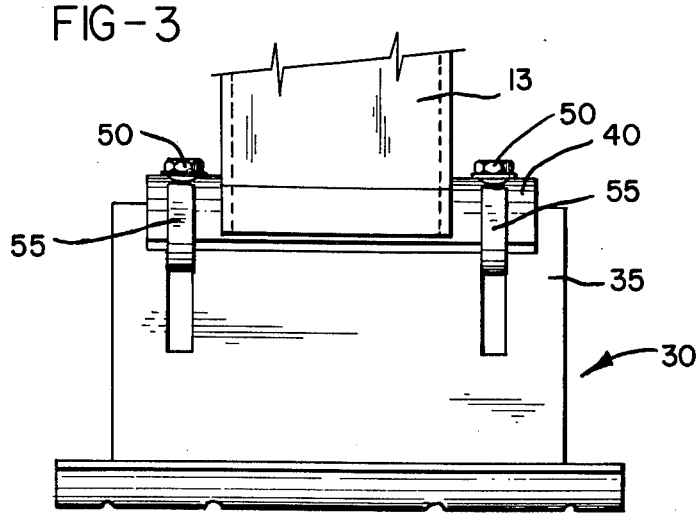
FIG. 3 is a front elevation of the sandshoe of FIG. 1.

Referring first to the embodiment of FIGS. 1 through 3, the improved sandshoe is illustrated generally at 30 and is shown as being used with the landing gear 10 previously described. However, the extensible tube 13 of the landing gear is modified at its lower end somewhat as will be described in greater detail below.

The sandshoe 30 is formed of sheet metal and has a generally planar ground contacting platform 32 with upwardly turned forward and rearward ends 33 and 34. An inverted, generally V-shaped wedge or support member 35 is mounted on the upper surface of the platform 32 between the ends 33 and 34. Thus, the member 35 is formed with one inclined leg 36 welded to the upper surface of the platform 32 and a second oppositely inclined leg 37 similarly welded to the upper surface of the platform. Ribs 32' formed on the upper surface of the platform 32 serve to locate the legs 36 and 37 on the platform.

The upper end or apex 38 of the support 35 is formed with a generally semi-cylindrical radius and is received with a generally C-shaped, downwardly opening yoke 40. The yoke 40 is welded to the bottom of the movable landing gear leg or tube 13. The yoke 40 is also semi-cylindrical and extends tranversely a distance somewhat less than the width of the support member 35, as seen in FIG. 3, and is preferably formed with a radius or an opening which complements that of the apex portion 38 of the support member 35, with slightly outwardly-turned marginal edges 45. However, if desired, the member 40 may be made with a radius which is slightly less than the apex portion 38 of the member 35 so that initial contact is made at the edges 45. However, when the weight from the semi-trailer is applied by the tube 13 to the yoke 40, the yoke will tend to be deflected outwardly and will move into conforming relation to the adjacent outer curvature of the apex portion 38 of the support member 35.

Means for retaining the sandshoe 30 on the leg 13 includes a pair of threaded fasteners 50 in the form of depending bolts extending through the top of the yoke 40 and terminating within the interior of the support member 35 at the apex region 38. A spring washer 52 is wedged underneath the apex and is retained by the nuts 53 to provide some freedom of pivotal fore and aft movement of the sandshoe 30 on the leg 13 without shearing of the fastener.

Preferably, auxiliary means are provided for retaining the sandshoe in assembled relation to the yoke 40 in the event that the nuts become loose or the bolts are sheared off, and in the embodiment of FIGS. 1–3, tabs 55 are pierced out of the legs of the support member 35 and are curved upwardly in somewhat overlying and interfitting relation above the adjacent sides of the yoke 40. Two of the tabs 55 are thus formed from each of the legs 36 and 37, and the ends of these may be peened or hammered over the top surfaces of the yoke 40 after the parts are assembled, as shown in FIG. 2.

Figure 4:
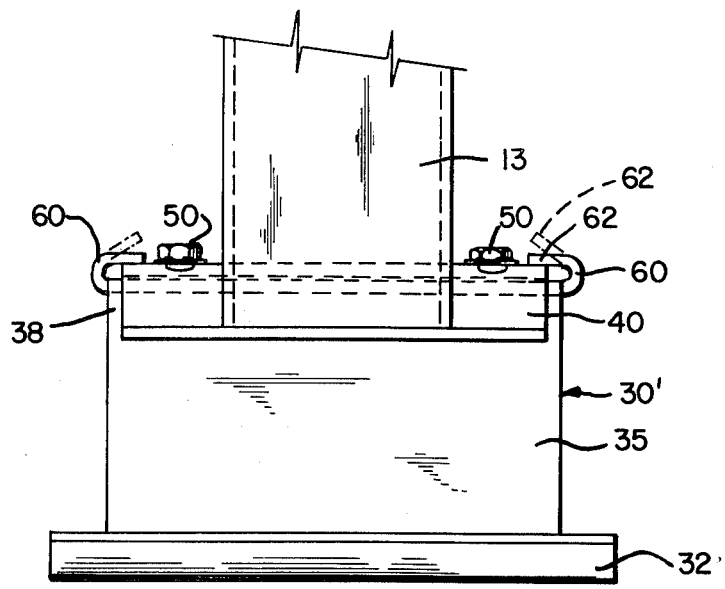
FIG. 4 is a front elevation of the sandshoe showing a modification of the retainer.

In FIG. 4 a sandshoe 30' is shown which is modified to the extent that the auxiliary retaining means consists of a pair of inwardly turned, generally C-shaped tabs 60 which have their lower ends welded to the support member 35 at the apex 38 and which have upper ends 62 bent down in overlying relation to the upper surface of the yoke 40.

Figure 5:
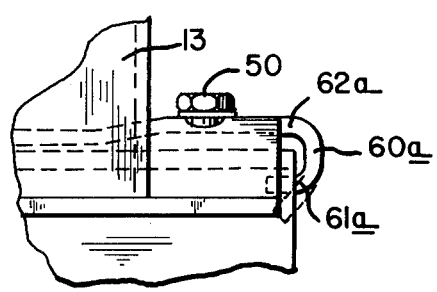
FIG. 5 is a fragmentary enlarged section showing another modification of the retainer.

FIG. 5 illustrates a somewhat modified form 60a of the tab 60 in which the upper end 62a is now welded to the yoke 40 at the transverse edge thereof and the bottom end 61a is received in underlying relation to the upper end or apex of the member 35. In the embodiment of FIG. 5, identical tabs 60a may be employed at each end of the yoke, and one of the tabs 60a may be formed partially open as shown in the broken lines and then peened up after assembly to aid in ease of assembly.

With respect to each of the embodiments, the included angle formed by the legs 36 and 37 is approximately 60°. Thus, the weight or load applied to the landing gear is transmitted through the legs to the platform 32 placing the region of the platform between the legs in tension. The applied tensile force is equal to the load applied to the apex. In this manner, the platform 32 of the sandshoe is stressed primarily in tension, and thus greatly resists deflection or bending due to uneven applications of the reactive underlying load, such as is due to the unevenness of the underlying ground. A lightweight and yet strong sandshoe is thus provided. Pivotal deflection of the sandshoe within the yoke 40 is permitted by deflection of the spring washer 52 and the assembled position of the sandshoe on the yoke is assured by the tabs 55, 60 and 60a of the respective embodiments.

As noted above, the yoke 40 preferably is provided with an inside semi-cylindrical curvature which is substantially the same as the upper curvature of the apex of member 35 or slightly less than such upper curvature to provide for the outward deflection of the yoke 40 under load.

While the forms of apparatus herein described constitute preferred embodiments of this invention, it is to be understood that the invention is not limited to these precise forms of apparatus, and that changes may be made therein without departing from the scope of the invention.

What is claimed is:

1. An improved sandshoe assembly for a semi-trailer landing gear, comprising a landing gear leg, means at the lower end of the landing gear leg forming a transversely oriented, generally C-shaped downwardly opening yoke, a sandshoe including an inverted generally V-shaped support member and a bottom platform, means connecting said support member to said yoke with the apex of said support member received within said yoke while providing for fore and aft tilting movement on said yoke, means joining said platform to said support member at the bottom edges of the side walls of said member, whereby the weight of the trailer is transferred from said yoke to the apex of said support member and through the side walls of said support member to said platform inducing a tension condition in said platform between said side walls for stiffening said platform against deformation and indentation due to applied loads thereon.

2. The sandshoe assembly of claim 1 in which the curvature defined by said yoke complements the curvature defined by said apex.

3. An improved sandshoe assembly for a semi-trailer landing gear, comprising a landing gear tube, means at the lower end of the landing gear tube forming a transversely oriented, generally semi-cylindrical downwardly opening yoke, a two-piece sandshoe including an inverted generally V-shaped support having a pair of spread-apart legs, the apex of said support defining a semi-cylindrical region proportioned to be received within said yoke, means connecting said support to said yoke at said apex providing for limited fore and aft tilting movement thereof, a bottom platform, said platform being attached to said support at the bottom edges of said legs, said platform extending longitudinally beyond said support legs and terminating in upwardly angled ends, whereby the weight of the trailer is transferred from said yoke to the apex of said support and through said support legs to said platform inducing a condition of tension in the region of said platform between said legs for stiffening said platform against deformation and indentation due to the applied load thereon.

4. The assembly of claim 3 in which said connecting means comprises a pair of bolts extending through said yoke and through said support at the apex thereof, and spring means on said bolts engaging said support on the side thereof opposite said yoke.

5. The assembly of claim 4 further comprising tab means interfitted between said support and said yoke providing for retention of said support on said yoke in the event of loss or failure of said bolts.

6. The assembly of claim 3 in which said legs define an included angle of approximately 60°.

* * * * *